ns PatentOffice
3,087,470
Patented Apr. 30, 1963

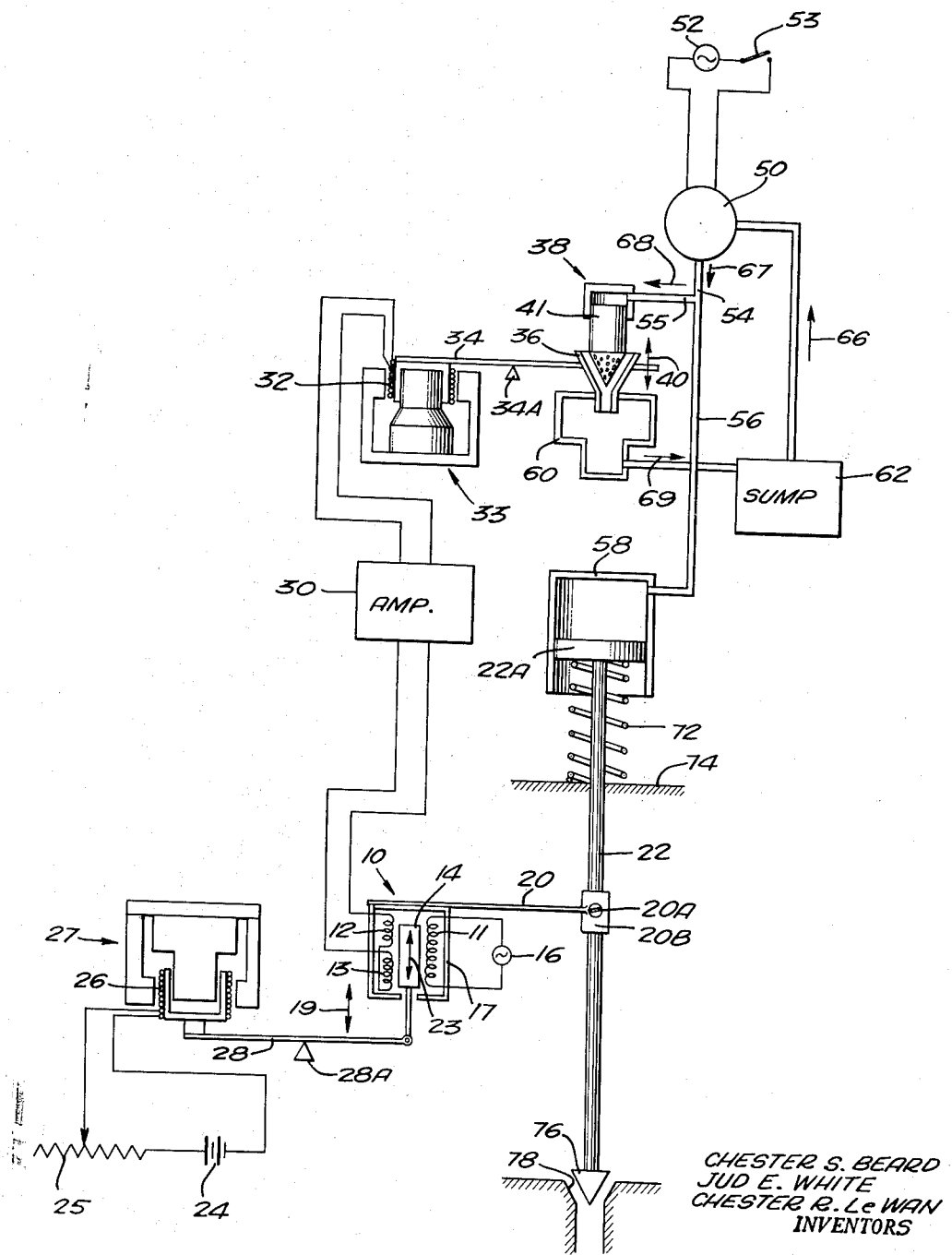

3,087,470
PROPORTIONAL POSITIONING SYSTEM
Chester S. Beard, Hollywood, Jud E. White, Burbank, and Chester R. Le Wan, La Crescenta, Calif., assignors to General Controls Co., Glendale, Calif., a corporation of California
Filed May 31, 1960, Ser. No. 32,633
7 Claims. (Cl. 121—41)

The present invention relates to means and techniques for positioning an element in accordance with a characteristic of a control signal and has particular applicability to a valve controlling system wherein it is desired to move a valve element in substantially linear relationship with respect to the intensity of a control signal.

Briefly, the system described herein includes a control transformer having a pair of coils acting differentially on a core, the coils being movable in accordance with a condition which is to be established and the core being movable in accordance with a signal establishing such condition. An output of the transformer is amplified and used to effect a repositioning of the coils and to position a control element. By these means the position of the coil system and the control element connected thereto is automatically established in accordance with the intensity of the signal. It will be appreciated that the coil and core may be reversed in the sense that the coils may be positioned in accordance with the control signal and the core may be positioned in accordance with the condition to be established.

It is therefore an object of the present invention to provide a novel control system of this character.

A specific object of the present invention is to provide a control system of this character wherein a hydraulic system is controlled in accordance with the signal from the coil-core system such that the desired condition is established.

Another specific object of the present invention is to provide a novel servo system of this character wherein the condition to be established is accomplished using novel hydraulic positioning means.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which the single FIGURE of the drawing illustrates a control system embodying features of the present invention.

The system includes a control transformer 10 having a primary coil 11, a pair of secondary coils 12, 13 connected to achieve a differential effect with respect to the associated magnetizable core 14. The coil 11 is energized by an A.C. source 16.

The coils 11, 12, 13 are mounted as a unit on coil support 17 which is movable in an up and down direction as indicated by the double arrowed line 19 by an arm 20 attached to a rectilinearly movable piston shaft 22 attached to piston 22A in accordance with a condition to be established. The associated core 14 is also movable in the same up and down direction as indicated by the double arrowed line 23 in accordance with an adjustable control signal derived from the D.C. source 24 which is serially connected with the adjustable resistance 25 and the movable coil 26 of a D'Arsonval-type control force motor 27. The movable coil 26 is connected by lever 28 to the core 14 to produce the aforementioned movement of the core 14 and its position in accordance with the adjusted position of resistance 25. For this purpose the lever 28 is fulcrumed about its fulcrum 28A.

The pair of differentially connected coils 12, 13 having a combined output equal to the difference in voltage induced in the same considered individually is connected to the input terminals of amplifier 30; and the output of amplifier 30 is applied to the moving coil 32 of the force motor 33. This coil 32 is mechanically connected by lever 34 to the movable funnel-shaped element 36 of a spill valve 38 to produce an up and down movement of the element 36 within the stationary outlet 60 as indicated by the double arrowed line 40. Such element 36 also moves in the same direction with respect to the cooperating conical apertured end of inlet 41 of the spill valve for controlling the flow of fluid through the spill valve. For these purposes the lever 34 is fulcrumed at an intermediate point thereon on its fulcrum 34A.

The motor-driven pump 50 energized from A.C. source 52 through switch 53 supplies fluid to the valve inlet 41 through conduits 54 and 55 and also supplies fluid under pressure through conduits 54 and 56 to the interior of cylinder 58.

It will be seen that operation of the spill valve 38 regulates or controls the pressure in conduit 56, i.e. in cylinder 58.

The outlet 60 of spill valve 38 is in communication with the pump sump or reservoir 62 from which the fluid is recirculated through the spill valve as indicated by the arrows 66, 67, 68, and 69.

The cylinder 58 is stationarily mounted while its piston 22A is movable against the spring bias of the coil compression calibrated spring 72 having one of its ends bearing against the fixed support 74 and the other one of its ends bearing against the piston 22A such that with increased pressure in line 56 the piston 22A moves downwardly to also move the attached coil support 17 downwardly.

This piston 22A is moved in accordance with the condition to be established and as illustrated this particular condition is exemplified by the degree of opening of a proportioning valve having its movable valve element 76 attached to the piston rod 22 to position such valve element 76 with respect to its seat 78.

In operation of the system, the adjustable resistance 25 is adjusted to produce a static current flow in the range of 1 to 5 milliamperes in the coil 26 to achieve a corresponding positioning of core 14. This adjustment causes an unbalanced voltage to be developed in the differentially connected coils 12, 13, i.e. an unbalanced voltage appears at the input to amplifier 30 which after amplification is applied to the motor coil 32 to in turn produce movement of the spill valve element 36 to a new position wherein it is effective to alter the pressure in line 56 and cylinder 58. This change in pressure in cylinder 58 results in movement of piston 22A and coil support 17 to a position wherein the original assumed unbalanced voltage is reduced. It is noted that the spill valve is capable of releasing flow in excess of the capacity of pump 50; thus movement of piston 22A may be obtained in either direction. The output of the amplifier varies as the input differential transformer positions the motor coil 32 which governs the opening and closing of the spill valve.

One unique feature of the system is that the coils of the differential transformer are movable in relation to the core. These coils are positioned in direct relation to the movement of the stem 22.

Thus the system creates a follow-up action caused by movement of stem 22 so that a balance may be achieved between the fluid pressure acting on piston 22A on the one hand and the forces acting on the piston 22A on the other hand, such forces being the force exerted by the prestressed coil-compression spring 72 and any other additional forces acting on the control rod 22 as, for example, forces developed in the valve 76, 78 or its packing gland through which the rod 22 extends, when such control rod is used to position valve element 76 as shown in the drawings. These additional forces may be of constant value in some cases, depending upon the control element attached to rod 22, or such additional forces may vary in value when such control element is a movable valve member 76 as shown in the drawings.

In a system constructed as described above, there is relatively instantaneous movement of the core 14 and spill valve element 36 without perceptible oscillations in the same and also the control rod 22 and coil structure 11, 12, 13 are moved without perceptible oscillation of the same, it being considered that the hydraulic control system involving the fluid pressure-controlled piston 22A provides sufficient damping in the system to prevent perceptible oscillations. It will be observed also that the unbalanced voltage derived from coils 12, 13 and applied to the input of amplifier 30 changes with the static position to which the rod 22 is moved.

One important feature of the present arrangement is that both the core 14 and the coil system 11, 12, 13 are movable. This allows adjustment of the system in those cases where ready access is not available to elements of the hydraulic portion of the system as, for example, the regulating valve 38. Indeed, any hydraulic adjustment which may be required is accomplished in an electrical sense by adjustment of the relative positions of the core and coil systems, the latter adjustment being made, for example, by the releasable adjustable connection being the elements 20 and 22 as, for example, releasing the set screw 20A in the sleeve 20B in which the rod 22 is normally fastened by such set screw. The position of the core 14 is, of course, adjusted by adjustable resistance 25. It has been found that there is a substantially linear relationship between the current in coil 26 and the position of the controlled element 76, notwithstanding that the forces developed on the valve element 76 may vary with respect to the particular position to which it is moved by rod 22.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. A system of the character described for positioning an element in accordance with a condition, means developing and applying a force to said element in one direction, means developing and applying a force to said element in a direction opposite to said one direction, first magnetic means positioned by said element, second magnetic means cooperating magnetically with said first means and positioned in accordance with said condition, and means responsive to the relative positions of the two aforementioned means for changing the magnitude of one of said forces applied to said element.

2. A system as set forth in claim 1 in which the first and second-mentioned magnetic means comprise a transformer and the last-mentioned means comprises hydraulically operated means responsive to a condition established by said transformer.

3. A system as set forth in claim 2 in which said last-mentioned means comprises a piston-cylinder having one of its elements attached to said element and incorporating means for automatically regulating the pressure in said piston-cylinder in accordance with a condition sensed by said transformer.

4. In a system of the character described, a transformer having two movable elements one of which is a core and the other one of said elements is a pair of differentially connected coils cooperating magnetically with said core, means positioning one of said two elements in accordance with a condition, means for positioning a member in accordance with said condition, the other one of said elements being connected to said member for movement thereby, an expansible chamber motor having a piston connected to said member for positioning the same, means biasing said piston for movement in one direction, a hydraulic system comprising a pressure source and a spill valve in communication with said source, said source being in communication with said motor for operating said piston in a direction opposite to said one direction against said biasing means, and means responsive to the relative position of said two elements for positioning said spill valve to control the pressure applied to said expansible chamber motor.

5. In a system of the character described comprising a first force motor having a coil which is positioned in accordance with the amount of current flow therethrough, means for adjusting the current through said coil to position the same in accordance with a condition, transformer means comprising two elements, namely a movable core and a movable pair of differentially connected coils magnetically associated with said core, a second force motor incorporating a second coil, means positioning said second coil in accordance with the relative position of said two elements, the first-mentioned coil being connected to one of said elements for moving the same, a fluid pressure motor comprising a movable member operated thereby connected to the other one of said elements, a hydraulic system including a pressure source having its outlet connected to said fluid pressure motor for producing movement of said movable member and said other element in accordance with pressure applied to said fluid pressure motor, means biasing said movable member for movement in one direction, means for regulating the pressure applied by said source to said fluid pressure motor for moving said movable member in a direction opposite to said one direction against said biasing means, and means interconnecting said second coil to said regulating means for regulating said pressure applied to said fluid pressure motor in accordance with the relative positions of said two elements.

6. In a system of the character described for positioning an element, first means continuously developing a first force acting on said element and tending to move it in one direction; second hydraulic means developing a second force acting on said element to move it in a direction opposite to said one direction and to balance said first force; a magnetic structure having two movable magnetically interacting parts; one of said parts being connected to said element for movement therewith; the other one of said parts being movable in accordance with a condition; and means responsive to the relative positioning of said two movable parts for controlling continuously the magnitude of second force over a continuous range of values of its magnitude.

7. A system as set forth in claim 6 in which said second hydraulic means comprises a pressure source, a hydraulic cylinder, a piston in said cylinder connected to said element, a conduit communicating said pressure source with said cylinder, a spill valve controlling the pressure in said conduit, and said means responsive to the relative positioning of said movable parts controlling said spill valve.

References Cited in the file of this patent

UNITED STATES PATENTS

| | | |
|---|---|---|
| 2,278,396 | Saur | Mar. 31, 1942 |
| 2,576,611 | Lang et al. | Nov. 27, 1951 |
| 2,662,540 | Rutherford et al. | Dec. 15, 1953 |
| 2,722,198 | Macgeorge | Nov. 1, 1955 |

FOREIGN PATENTS

| | | |
|---|---|---|
| 228,789 | Great Britain | Feb. 12, 1925 |
| 212,669 | Australia | Jan. 29, 1958 |
| 333,301 | Switzerland | Nov. 29, 1958 |